United States Patent [19]

Robinson

[11] 3,751,227

[45] Aug. 7, 1973

[54] REACTIVE WASTE GAS TREATING DEVICE

[76] Inventor: Philip W. Robinson, 7831 Seventh St., Downey, Calif. 90241

[22] Filed: Nov. 4, 1971

[21] Appl. No.: 195,733

[52] U.S. Cl. .................. 23/260, 23/284, 23/286, 423/210, 423/244, 55/474
[51] Int. Cl. ........................ B01j 9/10, B01j 1/22
[58] Field of Search ................ 23/284, 283, 260; 423/244; 48/85.1; 55/474, 390, 99, 78, 79

[56] References Cited
UNITED STATES PATENTS
2,520,096   8/1950   Harter .................................. 23/284
2,682,444   6/1954   Phillipps .......................... 23/284 X Primary Examiner—James H. Tayman, Jr.
Attorney—William C. Babcock

[57] ABSTRACT

A waste gas treating device in which a bed of relatively large size particled material which is chemically reactive to at least a portion of the components in the gas is subjected to movement as a stream of waste gas that is to be treated flows therethrough. The particled material is so chosen that it may be disposed to define a porous bed through which the waste gas flows to form layers of nonvolatile salts on the exterior surfaces of the particled material.

An ideal particled material for this purpose is crushed limestone that is but slightly soluble in water, but which reacts with waste gases containing certain acids and acid-forming components such as the various oxides of sulfur and nitrogen to form salts thereon. The movement of the particled material in the bed is such that it is constantly recycled, and during the recycling operation may, if desired, be subjected to washing to remove films of salts therefrom. The constant movement of the particles of the material relative to one another also tends to remove the films of formed salts on the exterior surface thereof by abrasive action. Thus, the particles due to the washing and abrasive action has fresh surfaces exposed to the reactive waste gases, and optimum removal of the reactive components from the waste gas is achieved.

11 Claims, 2 Drawing Figures

INVENTOR.
PHILIP W. ROBINSON
BY
William C. Babcock
ATTORNEY

REACTIVE WASTE GAS TREATING DEVICE

BACKGROUND OF THE INVENTION

1. Field of the Invention

Reactive waste gas-treating device.

2. Description of the Prior Art:

During the past few years it has become increasingly evident that the atmosphere is being polluted by the discharge of waste gases thereto from industrial plants. Such waste gases arise from the burning of sulfur-bearing coal and oil, smelting and metal refining operations, plating plants, glass furnaces and the like. In the past, waste gases have been cleansed of atmosphere-polluting materials to a degree by subjecting the gases to washing operations. However, the washing of the waste gases results in the wash water being contaminated with acid-forming com-ponents such as the oxides of sulfur and the like, and the disposal of such acidic wash waters is now prohibited in many areas due to such waters contaminating rivers and streams.

The primary purpose in devising the present invention is to supply means for treating waste gases containing reactive components to drastically reduce the percentage of such components discharged to the ambient atmosphere, and without in so doing creating large quantities of wash waters that are contaminated with acidic materials to the extent that they cannot be discharged into rivers or streams.

A further object of the invention is to supply a device and method for treating reactive waste gases by the use of a low cost material, such as crushed limestone, which is capable of reacting with the waste gas without the prior operational disadvantages of forming large quantities of acidic wash water as a result thereof.

SUMMARY OF THE INVENTION

A device for holding a relatively thick bed of particled material such as crushed limestone or the like in such a manner that the bed is relatively porous and waste gases may move therethrough. The bed of particled material is subjected to constant movement, and this movement results in the particled material being recycled as it becomes contaminated by the waste gasses forming salts on the exterior surface thereof. As the material is recycled, it is subjected to an operation to remove the salts therefrom and is then again returned to the bed with fresh surfaces exposed to the reactive gas to facilitate the formation of new layers of salts thereon.

As such salts are formed, reactive components of the waste gas are removed therefrom prior to the discharge of the gas to the ambient atmosphere. The constant movement of the particled material in the bed results in the particles rubbing against one another and as a result being subjected to abrasive action which tends to remove films of salts therefrom.

A major object of the present invention is to subject a moving bed of particled material, such as crushed limestone or the like, to a stream of waste gases containing components that chemically react with the limestone to form nonvolatile salts, with the gases in so forming such salts being depleted of reactive components that are detrimental to animal and plant life prior to the waste gas being discharged to the ambient atmosphere.

A further object of the present invention is to provide an apparatus and method for treating waste gases in which acidic components are removed from the gases without forming large quantities of waste wash water as a result thereof, which wash water is normally so acidic in character that it is prohibited from being discharged into streams and rivers in many areas.

DESCRIPTION OF THE PREFERRED EMBODIMENT

Figure 1:
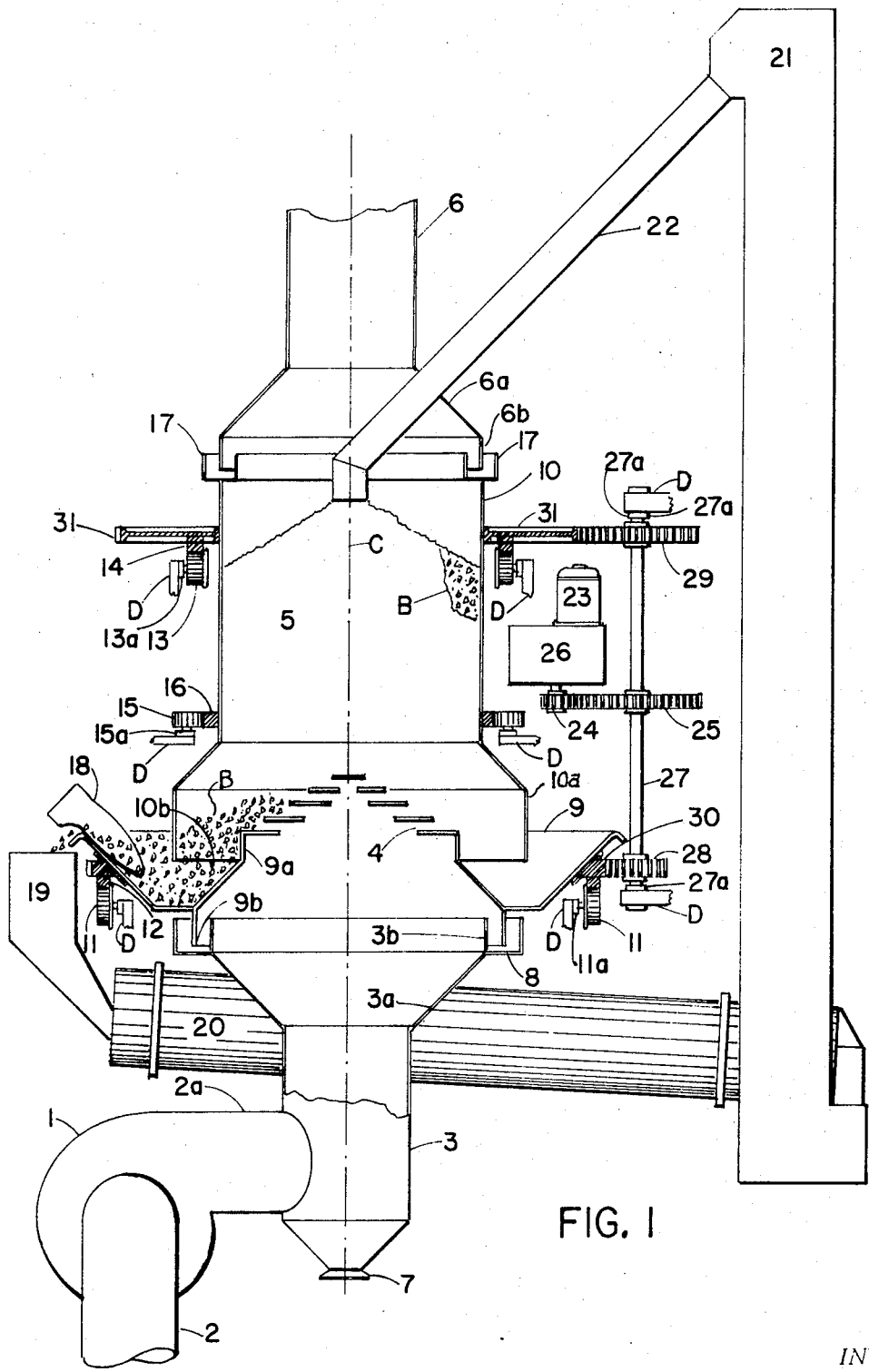
FIG. 1 is a schematic side elevational view of the waste gas-treating apparatus.
Figure 2:
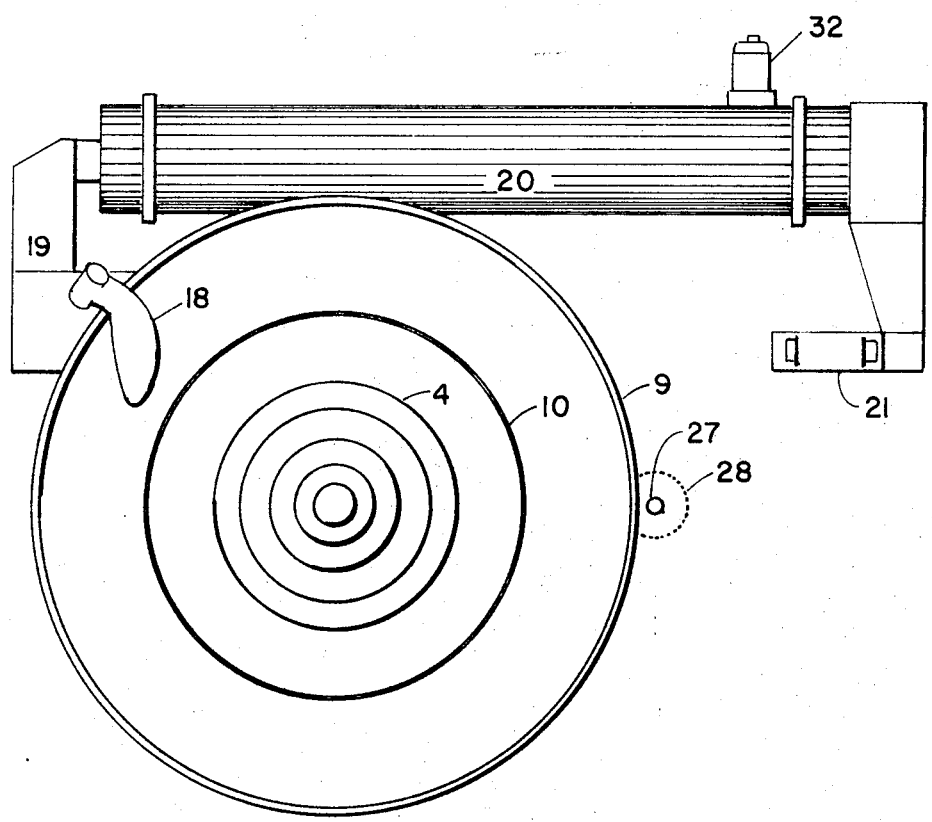
FIG. 2 is a transverse cross sectional view of the apparatus taken on the line 2—2 of FIG. 1.

The waste gas-treating apparatus A, as may best be seen in FIG. 1, includes a power driven fan 1 that has the suction side thereof connected to a pipe 2 that extends to the source of the reactive waste gases (not shown) that are to be treated. The discharge side of the fan 1 is connected by a horizontally extending pipe 2a to a vertical pipe 3. The pipe 3 on the upper end thereof develops into a frusto-conical shell 3a that merges on its upper edge into a short cylindrical side wall 3b. A grate 4 is provided that is situated within the confines of a lower flared end 10a of a cylindrical shell 10 in which a bed B of particled material such as crushed limestone or the like is contained. The lower flared end 10a of cylinder 10 cooperates with an inwardly disposed cylindrical wall 9a to define an annulus-shaped space 10b through which the material defining bed B may flow downwardly into the confines of an annulus-shaped tray 9. The center of the grate 4 and the center of the vertically extending pipe 3 are preferably axially aligned on a center line C. The shell 10 has a large diameter stack 6 situated thereabove, and this stack develops on the lower end thereof into a flared portion 6a. The portion 6a on the lower end thereof merges into a cylindrical wall 6b.

The pipe 3, as may best be seen in FIG. 1 has a normally closed valve 7 on the lower end thereof for use in discharging dust and small particles of the particled material B therefrom. Such particled material may accumulate in the pipe 3 due to falling downwardly by gravity through the grate 4. The tray 9, as may be seen in FIG. 1, has a cylindrical wall 9b depending therefrom that extends into a circu'ar water seal 8 of L-syaped transverse cross section that extends outwardly from the wall 3b. The wall 9b and water seal 8 cooperate to prevent any waste gases discharging into the ambient atmosphere from between the upper limits of the wall 3b and the lower limi of the tray 9. The tray 9 has a horizontally disposed circular tract 12 secured thereto by conventional means, and the track being rotatably supported on the upper surfaces of a number of circumferentially spaced wheels 11 that are rotatably supported by conventional shaft means 11a that are secured to an open framework D that forms a part of the invention.

The crushed material retaining shell 10 has a large diameter gear 31 extending outwardly from the upper portion thereof, which hear on its lower face supports a circular rail 14 that is rotatably supported on a number of spaced, vertically extending wheels 13 that are secured to the frame D by conventional shaft means 13a. The cylindrical shell 10 at all times rotates on the center line C, due to the shell having a circumferentially extending hoop 16 secured to the exterior surface thereof, which hoop is in rolling engagement with a number of circumferentially spaced rollers 15 that are rotatably mounted on shaft means 15a which are secured to a portion of the frame D.

A plow 18 is provided that occupies a stationary position, and as the shell 10 and tray 9 are rotated relative to the plow, particled material B in the tray is pushed upwardly on the plow and discharges into the upper end of a chute 19. The chute 19 by gravity discharges the particled material B into a rotary conveyor 20 that may serve as a washer if supplied with wash water by conventional means (not shown). The conveyor 20 is disposed at an angle, in order that the particled material discharged into the left hand end thereof, as viewed in FIG. 1, will flow by gravity to the right hand end of the conveyor as the latter is rotated.

he particled material discharges from the conveyor 20 into a power operated elevator 21 of conventional design, whereby the particled material is raised to an elevated position and then allowed to discharge downwardly by gravity through a pipe 22 into the upper confines of the cylindrical shell 10. The pipe 22, as can best be seen in FIG. 1, extends through the pipe portion 6a. The upper end of the cylindrical shell 10 has a circular water seal 17 of U-shaped transverse cross section mounted on the upper end thereof, and the wall 6b of pipe 6 extending downwardly therein. The wall 6b and the water seal 17 permit the cylindrical shell 10 to be rotated relative to the stationary pipe 6 without breaking the seal therebetween. The pipe 6 directs treated waste gases upwardly to the ambient atmosphere.

An electric motor 23 or other prime mover is provided which by a gear reduction unit 26 rotates a driving gear 24 that is in toothed engagement with a driven gear 25 secured to a vertically extending shaft 27 that is rotatably supported from the frame D by conventional bearings 27a. The shaft 27 has a gear 28 mounted thereon that is in engagement with a toothed ring gear 30 secured to the exterior surface of the tray 9. Shaft 27 also supports a gear 29 that in engagement with a large diameter gear 31 secured to the shell 10. Thus, when the motor 23 is energized, the gears 28 and 29 are concurrently rotated to rotate the shell 10 and the tray 9. Due to the difference in diameters of the gears 28 and 29, the shell 10 and tray 9 rotate at different rates of speed and as a result the particled material B is subjected to substantial abrasive action as it moves from the shell 10 into the tray 9.

From the above description it will be seen that a body B of crushed limestone or the like is constantly recycled in such a manner as to be exposed to waste gas, with the reactive components of the gas combining with the limestone to form salts on the exterior thereof. The salts so formed may be removed therefrom by abrasive action as the limestone is recylced as previously explained. Should the user desire the recycled limestone may be exposed to water to remove water soluble salts therefrom, as the limestone moves through the conveyer 20. Should it not be desired to use water for washing the limestone, no water is discharged to conveyor 20, and the conveyor or washer is simply used to convey crushed limestone from the chute 19 to the elevator 21.

I claim:

1. A device for use in removing chemically reactive components from waste gas by contact with particled material that is sparingly soluble in water but forms salts when in contact with said components, said device including:
    a. an open framework;
    b. a vertical cylindrical shell open at the top and bottom;
    c. grate means in the lower end of said shell for supporting the lower center ortion of a porous bed of said particled material situated within the confines of said shell;
    d. a ring-shaped tray disposed under said shell that supports the portion of said bed not supported by said grate means;
    e. first means for rotatably supporting said shell at a fixed elevation on said framework;
    f. second means for rotatably supporting said tray from said framework at a fixed distance relative to said shell;
    g. third means for concurrently rotating said shell and tray and said particled material contained therein;
    h. a waste gas discharge stack situated above said shell;
    i. fourth means for discharging a stream of waste gas containing reactive components in an upwardly extending direction against said grate means, said stream of waste gas thereafter flowing upwardly through said bed for said reactive components therein to react with said particled material to form water soluble salts on the exterior surface thereof, and said waste gas free of the reactive components that have combined chemically with said particled material discharging from said bed to flow upwardly through said stack to the ambient atmosphere;
    j. fifth means for removing said particled mater-ial from said tray as said tray rotates, with said particled material as removed being replaced by particled material from said bed that flows into said tray by gravity;
    k. sixth means for washing said particled material as it is removed from said tray to dissolve said waste soluble salts thereon and provide fresh surfaces on said particled material that may subsequently be subjected to the action of said reactive components in said stream of waste gas;
    l. seventh means for elevating said washed particled material and depositing the same on the top of said bed in said shell;
    m. eighth means for effecting a movable seal between said fourth means and tray to prevent the escape of waste gas therebetween; and
    n. ninth means for effecting a movable seal between said stack and shell to prevent the escape of waste gas therebetween.

2. A device as defined in Claim 1 in which said first means includes:
    o. a horizontal circular rail that encircles said shell and is secured thereto; and
    p. a plurality of circumferentially spaced wheels rotatably supported from said framework and on which wheels said rail rests.

3. A device as defined in Claim 1 in which said second means includes:
    o. a horizontal circular rail that encircles said tray and is secured thereto; and
    p. a plurality of circumferentially spaced wheels rotatably supported from said framework and on which wheels said rail rests.

4. A device as defined in claim 1 in which said third means includes:
- o. first and second horizontal ring gears that extend around said shell and tray and secured thereto;
- p. a prime mover;
- q. a vertical rotatably supported shaft;
- r. a prime mover that drives said shaft; and
- s. third and fourth horizontal gears rigidly secured to said shaft and in toothed engagement with said first and second gears respectively.

5. A device as defined in claim 4 in which at least a portion of said first, second, third and fourth gears are of different diameters to cause said shell and tray to rotate at different speeds and subject said particled material to maximum abrasive action to remove films of slats from the exterior surfaces thereof.

6. A device as defined in Claim 1 in which said fifth means includes:
- o. a stationary plow that extends into said tray, with particled material being forced upwardly on said plow to drop downwardly from the upper end thereof by gravity as said tray rotates; and
- p. a chute that receives said material dis-charging from said plow and directing said particled material into said sixth means.

7. A device as defined in claim 1 in which said particled material is crushed limestone and said reactive components are at least in part a type that react with said limestone to form water soluble salts.

8. A device for use in removing chemically reactive components from waste gas by contact with particled material that forms slats when in contact with said components, said device including:
- a. an open framework;
- b. a vertical cylindrical shell open at the top and bottom;
- c. grate means in the lower end of said shell for supporting the lower center portion of a porous bed of said particled material situated within the confines of said shell;
- d. a ring-shaped tray disposed under said shell that supports the portion of said bed not supported by said grate means;
- e. first means for rotatably supporting said shell at a fixed elevation on said framework;
- f. second means for rotatably supporting said tray from said framework at a fixed distance relative to said shell;
- g. third means for concurrently rotating said shell and tray at different rates of rotation to subject said particled material to abrasive action to remove said salts from the exterior surfaces thereof;
- h. a waste gas discharge stack situated above said shell;
- i. fourth means for discharging a stream of waste gas containing reactive components in an upwardly extending direction against said grate means, said stream of waste gas thereafter flowing upwardly through said bed for said reactive components therein to react with said particled material to form salts on the exterior surface thereof, and said waste gas free of the reactive components that have combined chem-ically with said particled material discharging from said bed to flow upwardly through said stack to the ambient atmos-phere;
- j. fifth means for removing said particled material from said tray as said tray rotates, with said particled material as removed being replaced by particled material from said bed that flows into said tray by gravity;
- k. sixth means for elevating said material after it has left said tray and depositing the same on the top of said bed in said shell;
- l. seventh means for effecting a movable seal between said fourth means and tray to prevent the escape of waste gas therebetween; and
- m. eighth means for effecting a movable seal between said stack and shell to prevent escape of waste gas therebetween.

9. A device as defined in claim 8 in which said first means includes:
- n. a horizontal circular rail that encircles said shell and is secured thereto; and
- o. a plurality of circumferentially spaced wheels rotatably supported from said framework and on which wheels said rail rests.

10. A device as defined in claim 8 in which said second means includes:
- n. a horizontal circular rail that encircles said tray and is secured theret; and
- o. a plurality of circumferentially spaced wheels rotatably supported from said framework and on which wheels said rail rests.

11. A device as defined in claim 8 in which said third means includes:
- n. first and second horizontal ring gears that extend around said shell and tray and secured thereto;
- o. a prime mover;
- p. a vertical rotatably supported shaft;
- q. a prime mover that drives said shaft; and
- r. third and fourth horizontal gears rigidly secured to said shaft and in toothed engagement with said first and second gears respectively.

* * * * *